(No Model.)
W. T. CARROLL.
SPINDLE SUPPORT FOR SPINNING MACHINES.
No. 350,039. Patented Sept. 28, 1886.
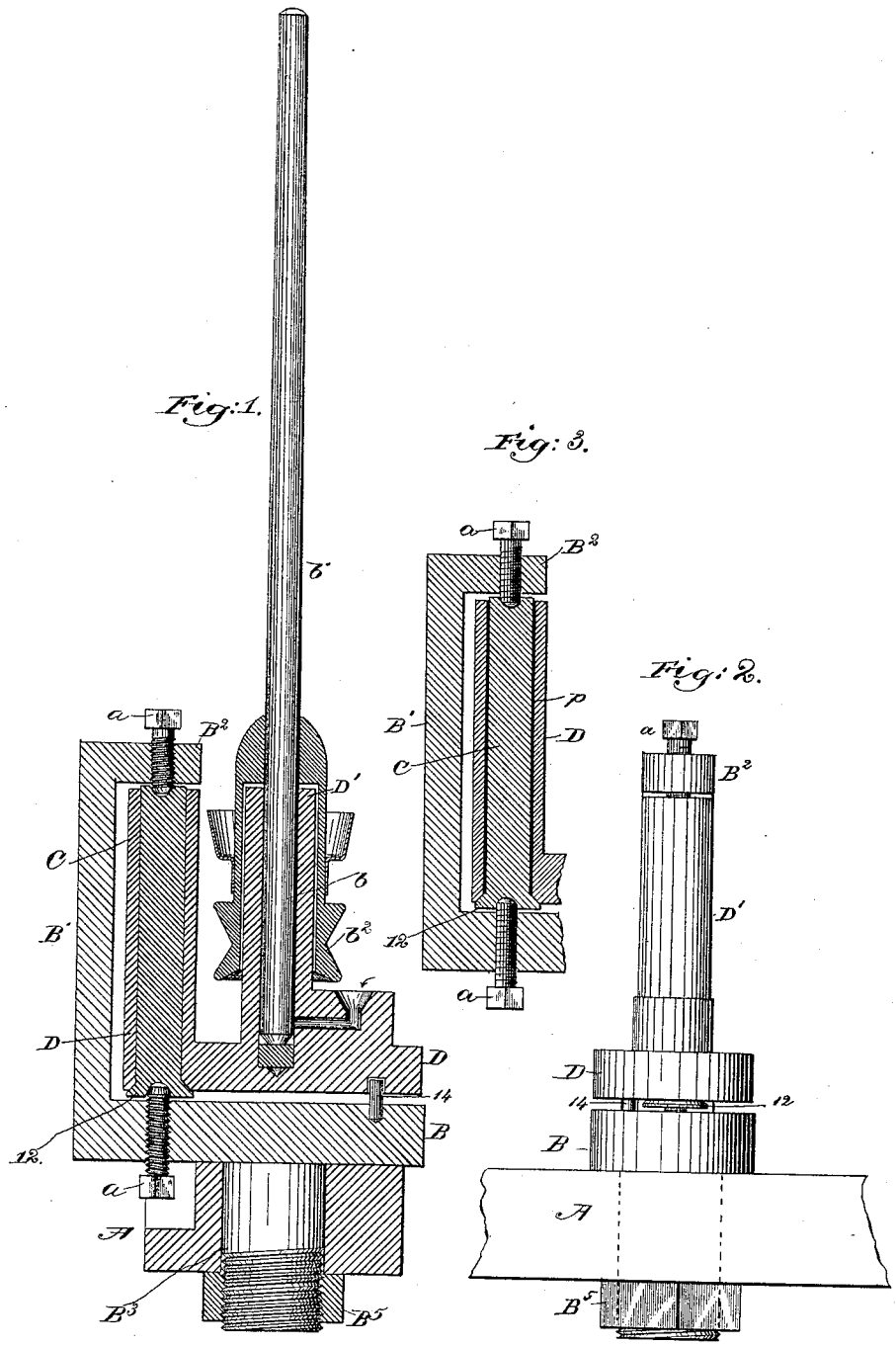
Witnesses.
Thomas Hobday.
John F. L. Prinkert
Inventor
William T. Carroll.
by Lemsby & Gregory attys
N. PETERS. Photo-Lithographer, Washington, D. C.

UNITED STATES PATENT OFFICE.

WILLIAM T. CARROLL, OF WORCESTER, ASSIGNOR TO GEORGE DRAPER & SONS, OF HOPEDALE, MASSACHUSETTS.

SPINDLE-SUPPORT FOR SPINNING-MACHINES.

SPECIFICATION forming part of Letters Patent No. 350,039, dated September 28, 1886.

Application filed May 28, 1886. Serial No. 203,520. (No model.)

*To all whom it may concern:*

Be it known that I, WILLIAM T. CARROLL, of Worcester, county of Worcester, and State of Massachusetts, have invented an Improvement in Spindle-Supports for Spinning-Machines, of which the following description, in connection with the accompanying drawings, is a specification, like letters on the drawings representing like parts.

This invention relates to improvements in supports for that class of spindles known as "top-spindles," or spindles having bolster-bearings only at their lower ends below the whirl, my present invention having more particularly for its object to provide a bearing which shall be free to move or oscillate for a slight extent in substantially every direction as the lower end of the spindle oscillates when run at high speed or when unequally loaded.

In my invention I do away entirely with a loose bolster placed within a bolster-case and surrounded by either an elastic packing or by oil.

My improved spindle-supports consists, essentially, of a block having a socket for the reception of the pintle of the spindle, the said block, parallel with the said socket, having a hole which receives a bolt provided with a collar, or shaped, as will be described, to sustain the weight of the said spindle-support, the said bolt being preferably mounted at its ends upon pivot-screws, the block turning on the said bolt as a pivot, and, if desired, the bolt referred to may rotate upon the said screws. The bolt referred to may, if desired, be surrounded with an elastic packing.

My invention consists, essentially, in the combination, with a spindle and a block having a socket for the pintle of the spindle, and also a hole parallel to the spindle-receiving socket, of a pivoted bolt and a bracket to hold the bolt, the block being free to turn on the bolt as a center or pivot as the foot of the spindle oscillates.

Figure 1 represents a sufficient portion of a spindle and support to illustrate my invention, the sleeve-whirl, the spindle-support, the bolt, the bracket, and bolster-rail being shown in section, while the spindle is in elevation. Fig. 2 is a right-hand elevation of Fig. 1, the spindle being omitted; and Fig. 3 is a sectional view of a modification, showing the bolt as provided with an elastic packing.

Referring to the drawings, A represents a spindle-rail, which is bored, as usual. Upon this rail is mounted a bracket or base, B, having an upright, B', provided with an ear, $B^2$, the said ear and the base of the bracket B being provided each with a point or pivot-screw, $a\ a$, the latter serving as pivots for or to hold said bolt C. The bolt C is extended loosely through an opening or hole in the block D, the said bolt constituting a fulcrum or pivot for and sustaining the weight of the said block.

In Fig. 3 I have shown an elastic or fibrous packing, $p$, which surrounds the bolt C and rests between it and the interior of the hole bored through the block D, as stated; but this packing may be omitted, the bolt C substantially filling the hole in the said block. Parallel with the hole or opening through which is extended the bolt C the part D' of the said block D is bored to form a socket for the reception of the pintle $b$ of the spindle $b'$, provided with a sleeve-whirl, $b^2$, of usual construction, the said pintle having a running fit in the said socket and being surrounded and held firmly by a rigid and unyielding wall, D', of the block D. The block D has a loose fit upon and turns freely with relation to the bolt C, held by the pivot-screws $a$. The shoulder 12 of the said bolt sustains the weight of the block D, so that the said block is permitted to move or oscillate for a limited extent in substantially every direction as the pintle of the spindle, when rotated rapidly or when unevenly loaded, moves or oscillates, such manner of supporting the block D compensating for any injurious jar in the spindle. The bracket B has a stem, $B^3$, which, extended through a hole in the bolster-rail and screw-threaded, receives upon it a nut, $B^5$, by which the bracket is secured to the bolster-rail. The bracket has a pin or projection, 14, to enter a hole of somewhat larger diameter in the block to restrain the rotation of the block, yet permitting it to move slightly on the said bolt as a fulcrum.

I claim—

1. The spindle, a block provided with a socket for the reception of the spindle, and having a hole substantially parallel to the said socket, and a bolt having a shoulder, 12, to sustain the weight of the said bracket, combined with a bracket and means to hold the said bolt therein in position parallel to the center line of the said socket, substantially as described.

2. The spindle and the block provided with a socket for the pintle of the spindle, and having a hole substantially parallel to the said socket for the reception of a bolt, combined with a bracket, the bolt, and screws or points $a$, to hold the bolt at its ends in the said bracket, the said bolt serving as the fulcrum for the block, substantially as described.

In testimony whereof I have signed my name to this specification in the presence of two subscribing witnesses.

WILLIAM T. CARROLL.

Witnesses:
E. D. BANCROFT,
ARTHUR W. BEARDSELL.